(12) United States Patent
Fahey

(10) Patent No.: US 7,694,652 B2
(45) Date of Patent: Apr. 13, 2010

(54) BIRD FEEDER WITH MAGNETICALLY SUPPORTED PERCH

(76) Inventor: Patrick S. Fahey, 15217 Lloyd Cir., Omaha, NE (US) 68144

( * ) Notice: Subject to any disclaimer, the term of this patent is extended or adjusted under 35 U.S.C. 154(b) by 278 days.

(21) Appl. No.: 11/732,338

(22) Filed: Apr. 3, 2007

(65) Prior Publication Data

US 2007/0227454 A1   Oct. 4, 2007

Related U.S. Application Data

(60) Provisional application No. 60/788,753, filed on Apr. 3, 2006.

(51) Int. Cl.
*A01K 39/00* (2006.01)
*A01K 5/01* (2006.01)

(52) U.S. Cl. ............... 119/52.3; 119/57.8; 119/57.9

(58) Field of Classification Search ........... 119/57.8, 119/52.2, 52.1, 72, 468, 531–537, 52.3, 707, 119/708, 467, 459, 429, 432, 434, 435, 428, 119/431; 335/84, 285, 296–298, 302, 306; 252/62.51, 62.56–57; 428/548, 611, 681; 446/92, 129, 137, 138; *A01K 3/00, 1/00, A01K 31/02, 13/00, 39/01, 5/01*
See application file for complete search history.

(56) References Cited

U.S. PATENT DOCUMENTS

| 3,011,476 | A | * | 12/1961 | Bell ............... 119/417 |
| 3,209,129 | A | * | 9/1965 | Sundblad ........... 235/441 |
| 4,541,362 | A | * | 9/1985 | Dehls ............. 119/57.9 |
| 4,841,910 | A | * | 6/1989 | Kilham ............. 119/468 |
| 4,917,778 | A | * | 4/1990 | Takada et al. ....... 205/181 |
| 4,965,953 | A | * | 10/1990 | McKinney .............. 43/2 |
| 5,826,540 | A | * | 10/1998 | Bridges ............ 119/52.3 |
| 5,969,183 | A | * | 10/1999 | Kawataka et al. ...... 562/607 |
| 6,349,673 | B1 | * | 2/2002 | Schumann .......... 119/52.2 |
| 6,415,737 | B2 | * | 7/2002 | Banyas et al. ....... 119/57.9 |
| 6,484,665 | B1 | * | 11/2002 | Brown-Canary Lawson et al. ............ 119/52.2 |
| 6,578,518 | B1 | * | 6/2003 | Conforti ........... 119/57.8 |
| 7,418,923 | B1 | * | 9/2008 | Banyas et al. ....... 119/57.9 |
| 7,493,872 | B1 | * | 2/2009 | McCully ............. 119/703 |
| 2002/0124806 | A1 | * | 9/2002 | Blohm ............. 119/57.8 |
| 2005/0263082 | A1 | * | 12/2005 | Rutledge .......... 119/51.01 |
| 2006/0016400 | A1 | * | 1/2006 | Rich et al. ........ 119/57.8 |

\* cited by examiner

*Primary Examiner*—Son T Nguyen
*Assistant Examiner*—Shadi Baniani
(74) *Attorney, Agent, or Firm*—Stinson Morrison Hecker LLP

(57) ABSTRACT

A bird feeder with a magnetically supported perch includes a bird feeder with a feed hopper body having a feed access opening therein to permit feeding birds to access bird feed stored within the bird feeder and a perch assembly mounting element mounted on the feed hopper body and a magnetic perch assembly including a longitudinally elongated perch bar having inner and outer ends. The perch bar includes a perch bar magnet section adjacent the inner end thereof, the perch bar magnet section being magnetically attracted to the perch assembly mounting element such that the perch bar is releasably magnetically mounted on and extends outwards from the perch assembly mounting element whereby the perch bar magnet is adapted to serve as a perch for birds landing thereon.

15 Claims, 7 Drawing Sheets

BIRD FEEDER WITH MAGNETICALLY SUPPORTED PERCH

CROSS-REFERENCE TO RELATED PATENTS

This application claims priority based on a provisional patent, specifically on the Provisional Patent Application Ser. No. 60/788,753 filed Apr. 3, 2006.

BACKGROUND OF THE INVENTION

1. Technical Field

The present invention is directed to bird feeders having feed access control perches and, more particularly, to a bird feeder having at least one magnetic perch for feeding birds which includes a feed hopper body, an access opening formed in the feed hopper to allow access to the feed stored therein, and a magnetically supported perch assembly mounted on the feed hopper body generally adjacent the feed access opening, the magnetic perch assembly including one or more magnets which are mounted on the feed hopper body in a stationary position, and at least one outwardly extending perch bar magnet which is secured to the stationary magnet by the magnetic force extending between the magnets such that when birds of smaller size and weight perch on the perch bar magnet, the magnetic attractive force retains the perch bar magnet in the outwardly extending position adjacent the feed access opening but when a heavier bird alights upon the perch bar magnet, the downward force exerted by the weight of the bird partially disengages the perch bar magnet from the stationary magnet thus allowing the perch bar magnet to swing downwards and dislodge the bird to prevent it from feeding at the feed access opening of the bird feeder.

2. Description of the Prior Art

Recreational bird feeding is an entertaining, educational and inexpensive pastime. Bird feeding hobbyists explore the relationship between the type and location of feeders and the seed offered in them to attract a variety of colorful songbirds to their backyard feeding stations. Feeders come in many different varieties, including the hopper-style, the tubular-style, or smaller versions of each which affix to a window to allow for close-up viewing of feeding birds. Of course, since the majority of bird feeds attract many different types of birds to eat the feeds, it is often the case that undesirable birds such as grackles, starlings and cowbirds will find and take over the feeder, thus quickly emptying the feeder of feed. There is therefore a need for a feeder device which will allow only certain desirable birds to feed while not permitting other, more undesirable birds or animals, such as squirrels, to feed.

One of the interesting facts about birds is that many of the most beautiful and melodic of the birds are smaller than their less desirable relatives. Many different feeders have attempted to make use of this fact by designing feeding devices which can react to the difference between the lighter, more desirable birds and the heavier, less desirable birds. For example, one of the more common types of bird feeders which makes use of this fact includes a weighted perch designed to close over the feed access openings when a heavier bird lands on the perch. Another common type of bird feeder utilizes a shorter perch that allows smaller birds to eat while larger birds are not able to land on the perch. Furthermore, cages and screens have been used on some feeders which permit only smaller birds to get to the food, but unfortunately this also restricts some larger, desirable birds such as mature cardinals from accessing the feed. One further disadvantage of the various prior art devices is that they generally include mechanical-type devices such as levers and springs which permit or deny access to the feed housed within the bird feeder, and these mechanical-type devices are notorious for malfunctioning and having relatively short working life spans. There is therefore a need for an improved bird feeder which will permit lighter songbirds to access the feed held within the bird feeder while preventing the larger, less desirable birds from accessing the feed, yet will do so in a manner that does not require significant maintenance or which includes complicated mechanical devices.

Therefore, an object of the present invention is to provide an improved bird feeder with a magnetically supported perch.

Another object of the present invention is to provide an improved bird feeder with a magnetically supported perch which includes a perch assembly mounting structure mounted on the feed hopper body of the bird feeder and a magnetic perch assembly including a longitudinally elongated perch bar having inner and outer ends, the perch bar including a perch bar magnet adjacent the inner end thereof, the perch bar magnet being magnetically attracted to the perch assembly mounting structure such that the perch bar is releasably magnetically mounted on and extends outwards from the perch assembly mounting structure whereby the perch bar magnet is adapted to serve as a perch for birds landing thereon.

Another object of the present invention is to provide an improved bird feeder with a magnetically supported perch wherein the perch bar at least partially disengages from the perch assembly mounting structure upon force being applied to the perch bar which exceeds the magnetic force releasably securing the perch bar on the perch assembly mounting means thereby preventing birds and other animals larger than a selected size from feeding at the bird feeder of the present invention.

Another object of the present invention is to provide a magnetically supported perch for bird feeders which can be retrofitted onto already existing bird feeders thereby providing the benefits of the present invention without requiring complete replacement of already existing bird feeders.

Finally, an object of the present invention is to provide an improved bird feeder with a magnetically supported perch which is relatively simple and durable in construction and is safe, efficient and effective in use.

SUMMARY OF THE INVENTION

The present invention provides a bird feeder with a magnetically supported perch which includes a bird feeder with a feed hopper body having a feed access opening therein to permit feeding birds to access bird feed stored within the bird feeder and a perch assembly mounting element mounted on the feed hopper body. A magnetic perch assembly includes a longitudinally elongated perch bar having inner and outer ends. The perch bar includes a perch bar magnet section adjacent the inner end thereof, the perch bar magnet section being magnetically attracted to the perch assembly mounting element such that the perch bar is releasably magnetically mounted on and extends outwards from the perch assembly mounting element whereby the perch bar magnet is adapted to serve as a perch for birds landing thereon.

The present invention as thus described provides substantial advantages over those bird feeders found in the prior art. For example, because the strength of the magnetic bond between the perch bar and the perch assembly mounting element may be modified or changed merely by substituting different strength magnets for the various elements thereof, the bird feeder with magnetically supported perch may be modified to permit only certain types of birds to feed at the bird feeder, depending on the weight of the bird. Furthermore, the fact that the perch bar partially disengages from the perch assembly mounting element upon the perch bar supporting a weight in excess of the magnetic bonding force between the perch bar and perch assembly mounting element means that squirrels and other such rodents cannot easily access the bird feed stored within the bird feeder, as the perch bar is not available for support of the animal during feeding. Finally, because the perch bar is magnetically supported on the perch assembly mounting element, mechanical failures of various elements such as mechanical springs, as found in many prior art devices, are eliminated due to the functional features of the present invention, as it has been found that over extended periods of use, such mechanical elements, when exposed to elemental forces such as rain, sun, and wind, steadily degrade in performance thus steadily diminishing and eventually eliminating the very functional characteristics for which the mechanical devices were originally designed. It is therefore seen that the present invention provides a substantial improvement over those bird perch dislodging devices for bird feeders found in the prior art.

DESCRIPTION OF THE PREFERRED EMBODIMENT

Figure 1:
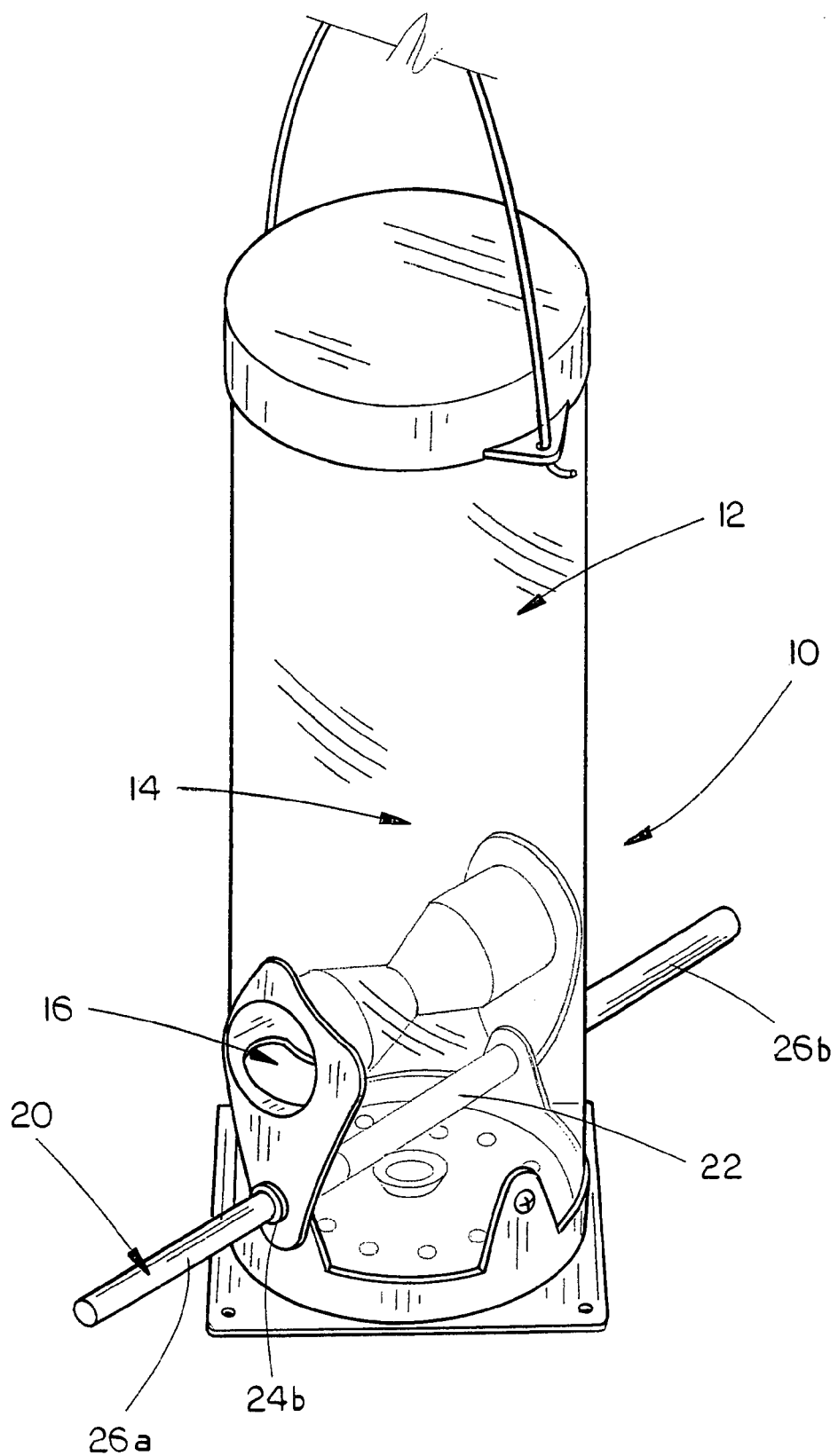
FIG. 1 is a perspective view of a first embodiment of the bird feeder with magnetic perch of the present invention.
Figure 2:
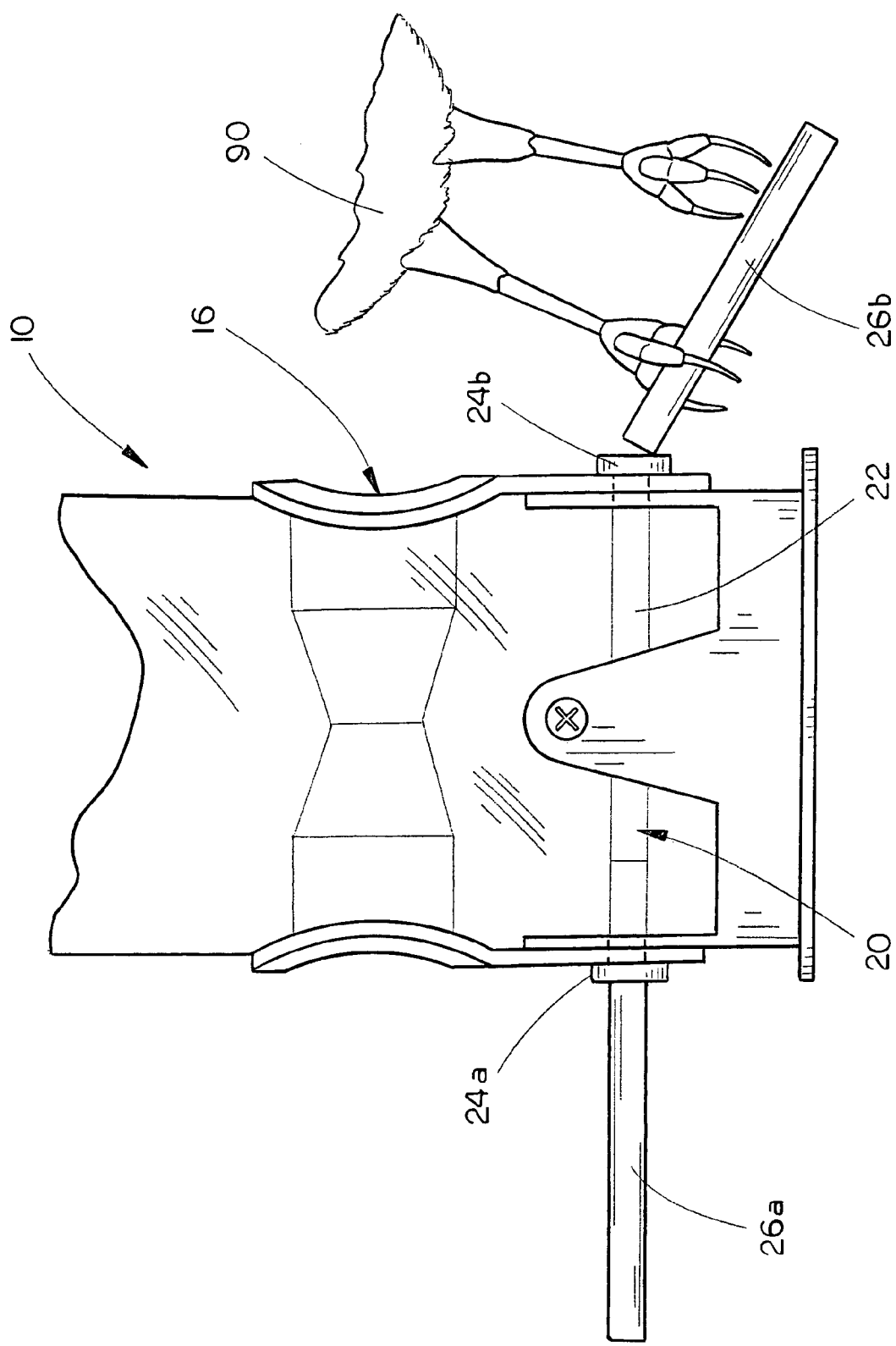
FIG. 2 is a detailed side elevational view of the perch magnet mounted on the stationary magnet affixed to the body of the bird feeder with a bird landing on the perch.
Figure 3:
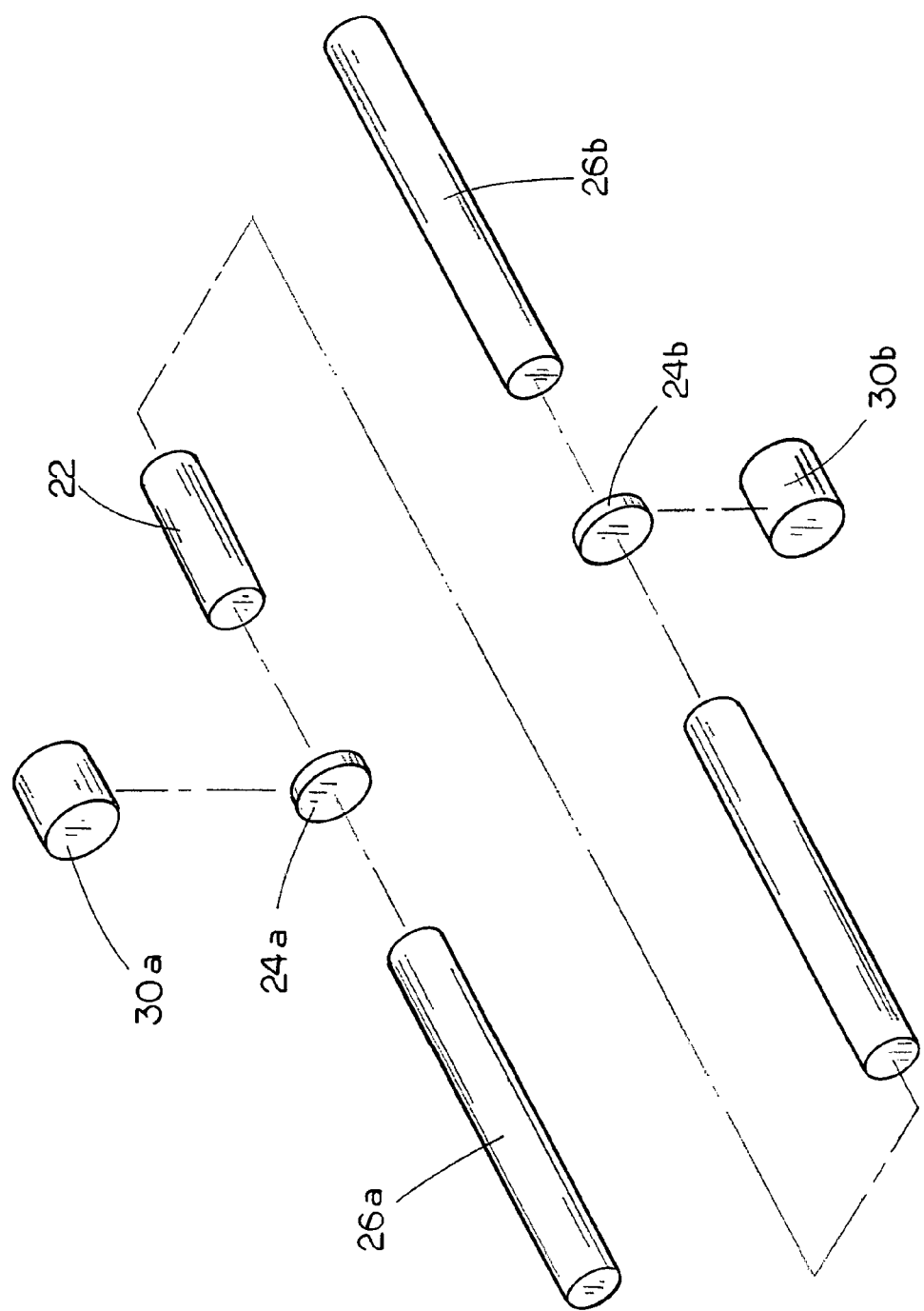
FIG. 3 is a detailed perspective view showing various sizes of magnets which can be used with the magnetic perch assembly of the present invention.

The bird feeder with magnetic perch 10 of the present invention is shown best in FIGS. 1-4 as including a standard-type bird feeder 12 which includes a feed hopper body 14 having a lower feed access opening 16 which permits feeding birds to access the feed stored within the bird feeder 12. It should be noted that the size, shape and construction materials used in connection with the bird feeder 12 are not particularly critical to the present invention, so long as the bird feeder 12 is capable of performing its intended function of feeding birds via the feed access opening 16. The bird feeder 12 shown in FIGS. 1-3 is of the tubular variety, although it should be noted that any type of bird feeder may be used in connection with the present invention so long as it includes a repository for feed and at least one feed access opening to permit the birds to access the feed stored within the bird feeder 12.

The novel portion of the present invention will now be described. Extending through and mounted on the bird feeder 12 beneath feed access opening 16 is a magnetic perch assembly 20 which, in the preferred embodiment, would include a center stationary magnet 22 which is mounted within the feed hopper body 14 of bird feeder 12 as shown best in FIGS. 1 and 2. The center stationary magnet 22 would preferably have a length slightly greater than the width of the feed hopper body 14 of bird feeder 12 such that the center stationary magnet 22 extends slightly beyond the outer walls of the feed hopper body 14 as shown in FIG. 2. Also, the center stationary magnet 22 may be constructed of more than one magnet linked together, should such construction be easier to incorporate into already existing bird feeders 12.

Releasably mounted on opposite sides of the center stationary magnet 22 are a pair of perch strength control magnets 24a and 24b and mounted on and extending outwards from the perch strength control magnets 24a and 24b are a pair of generally cylindrical perch bar magnets 26a and 26b designed to serve as perches for birds landing thereon. In the preferred embodiment, the perch strength control magnets 24a and 24b would be generally disk-shaped and would be interposed between the center stationary magnet 22 and perch bar magnets 26a and 26b to adjust the attractive force between the perch bar magnets 26a and 26b and the center stationary magnet 22. However, it should be noted that it may not strictly be necessary to include the center stationary magnet 22 at all, for if the perch strength control magnets 24a and 24b and perch bar magnets 26a and 26b are of sufficient strength, the perch strength control magnets 24a and 24b may simply be mounted on the exterior of the outer walls of the feed hopper body 14, and the magnetic perch assembly will still function correctly. Therefore, use of the center stationary magnet 22 is not required for proper functioning of the present invention.

In one embodiment of the present invention, perch bar magnets 26a and 26b would have diameters of approximately one quarter inch and lengths of approximately two inches each, perch strength control magnets 24a and 24b would have diameters of approximately five sixteenth inches and thicknesses of one sixteenth of an inch and the center stationary magnet 22 may consist of a single central piece or two connected pieces, with the overall length of the center stationary magnet 22 being approximately two and three quarters inches with a thickness or diameter of approximately one quarter inch. Of course, it should be noted that the precise sizes and shapes of the various magnets described herein are not critical to the present invention so long as the intended functionality of the magnetic perch assembly 20 is neither degraded nor destroyed.

Although it may be possible to use several different types of magnets with the present invention, one of the preferred types of magnets to be used with the present invention are referred to as neodymium magnets, which are members of the rare earth magnet family. These neodymium magnets are the strongest of the rare earth magnets and, in fact, are the strongest permanent magnets currently known. In general, a neodymium magnet of the type described above would include a neodymium core composed mainly of neodymium, iron and boron, and would further include a nickel casing enclosing the neodymium magnet material to both protect the neodymium material and make it easier to use the neodymium magnets for their various purposes. It has been found that the nickel casing on the magnets will not discourage birds from perching on the perch bar magnets 26a and 26b, yet because nickel has a relatively low coefficient of friction, when the magnetic perch assembly 20 functions as will be described later in this disclosure, the bird's grip can be relatively easily dislodged.

The magnetic perch assembly 20 of the present invention would function in the following manner. Once the center stationary magnet 22 is mounted within the feed hopper body 14 of bird feeder 12, the perch strength control magnets 24a and 24b would then be magnetically mounted on opposite ends of the center stationary magnet 22. The perch bar magnets 26a and 26b would then be magnetically mounted on the perch strength control magnets 24a and 24b on opposite ends of the center stationary magnet 22 such that the perch bar magnets 26a and 26b extend generally perpendicularly outwards from the feed hopper body 14 of bird feeder 12 below feed access opening 16, as shown best in FIGS. 1 and 2. Because of the magnetic force exerted between the perch bar magnets 26a and 26b and perch strength control magnets 24a and 24b in conjunction with the center stationary magnet 22, the perch bar magnets 26a and 26b are magnetically secured on the perch strength control magnets 24a and 24b.

Figure 4:
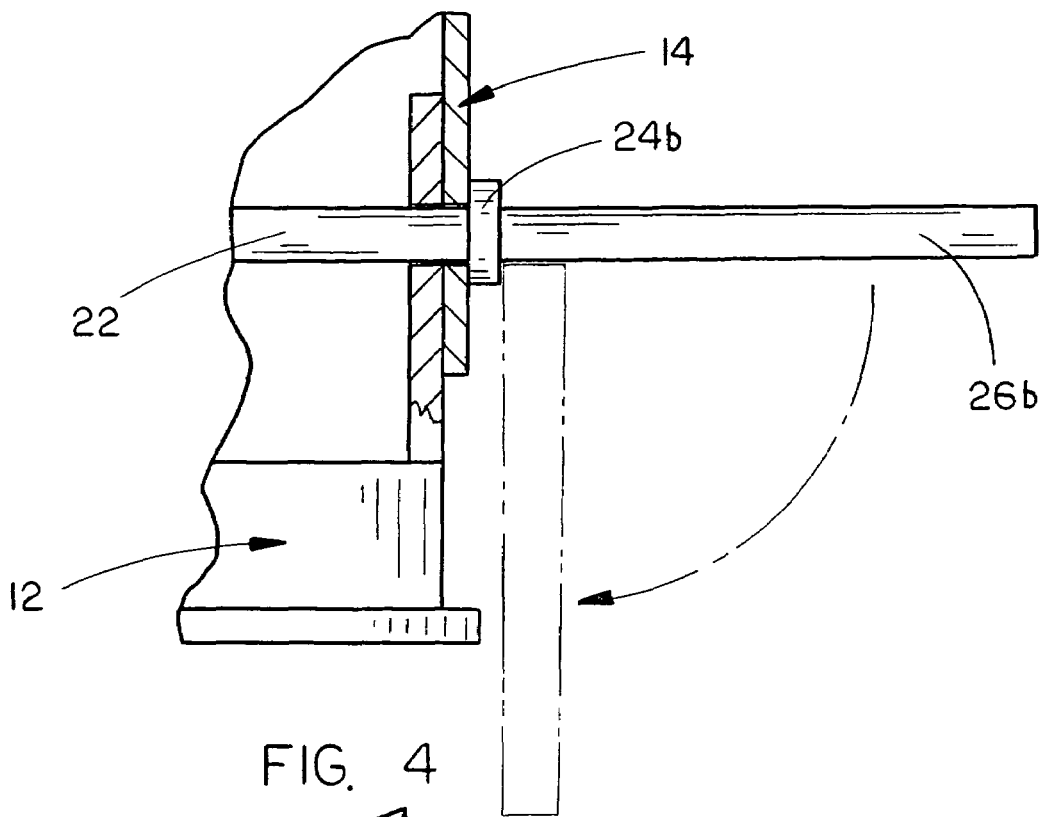
FIG. 4 is a detailed side elevational view of the perch magnet mounted on the stationary magnet affixed to the body of the bird feeder showing the perch magnet breaking away from the stationary magnet.

Once the feed hopper body 14 of bird feeder 12 is filled with seed, the seed is available to birds through the feed access openings 16 positioned above the perch bar magnets 26a and 26b. When a bird alights on one of the perch bar magnets 26b, as shown in FIG. 2, if the weight of the bird is below a threshold level determined by the magnetic force exerted between the perch bar magnet 26b and perch strength control magnet 24b, the perch bar magnet 26b remains in its generally horizontal position thus providing support for the bird. However, if the weight of the bird is above the threshold level determined by the magnetic force exerted between the perch bar magnet 26b and perch strength control magnet 24b, the perch bar magnet 26b will pivot downwards as it partially separates from the perch strength control magnet 24b, as shown in FIGS. 2 and 4. It should be noted that the force necessary to completely separate the perch bar magnet 26b from the perch strength control magnet 24b is much greater than the force necessary to partially separate the perch bar magnet 26b from the perch strength control magnet 24b, and the present invention utilizes this fact to function to restrict access to the bird feeder 12 by heavier birds. As the perch bar magnet 26b rotates downwards, the bird 90 who was attempting to perch on perch bar magnet 26b is startled due to the release of its intended perch and it will release its talons from grasping the perch bar magnet 26b and quickly fly away from the bird feeder 12. Once the bird 90 has released the perch bar magnet 26b, the magnetic force applied between the perch strength control magnet 24b and perch bar magnet 26b will likely cause the perch bar magnet 26b to "spring back" to its original, outwardly-extending position magnetically mounted on the perch strength control magnet 24b. The magnetic perch assembly 20 is then once again ready to receive a bird of proper weight and size thereon to support it for feeding yet prevent larger birds from standing on the perch bar magnets 26a and 26b without being dislodged therefrom.

One of the important and beneficial features of the present invention is shown best in FIG. 3 in that the size of the perch strength control magnets 24a and 24b may be modified to increase or decrease the attractive force exerted between the center stationary magnet 22 and perch bar magnets 26a and 26b. Specifically, another set of perch strength control magnets 30a and 30b may be substituted for the original perch strength control magnets 24a and 24b which provides a stronger magnetic force exerted between the center stationary magnet 22, perch strength control magnets 30a and 30b and the perch bar magnets 26a and 26b whereby heavier birds may be supported on the perch bar magnets 26a and 26b. This may become important when different species of birds are desired by the owner of the bird feeder 12, and it becomes necessary therefore to increase or decrease the weight capacity of the perch bar magnets 26a and 26b. It is believed that through experimentation with the perch strength control magnets 24a and 24b and perch bar magnets 26a and 26b that ranges and values for each of the birds and bird species to be supported by the perch bar magnets 26a and 26b will be computed, but it is expected that a breakaway load strength for the magnetic perch assembly 20 should be within the range of approximately 1.5 to 3.0 ounces as supportable by the perch bar magnets 26a and 26b, with the center of the load positioned at approximately the midpoint of the perch bar magnets 26a and 26b. Of course, movement of the load position toward the outer end of the perch bar magnets 26a and 26b will modify the breakaway load values, as well as movement of the load toward the inner end of the perch bar magnets 26a and 26b, but it is believed that the majority of birds landing on the perch bar magnets 26a and 26b will likely be positioned adjacent the midpoint of the perch bar magnets 26a and 26b, and therefore the above-described weight support values should be generally accurate to permit proper feeding of desirable songbirds.

Figure 5:
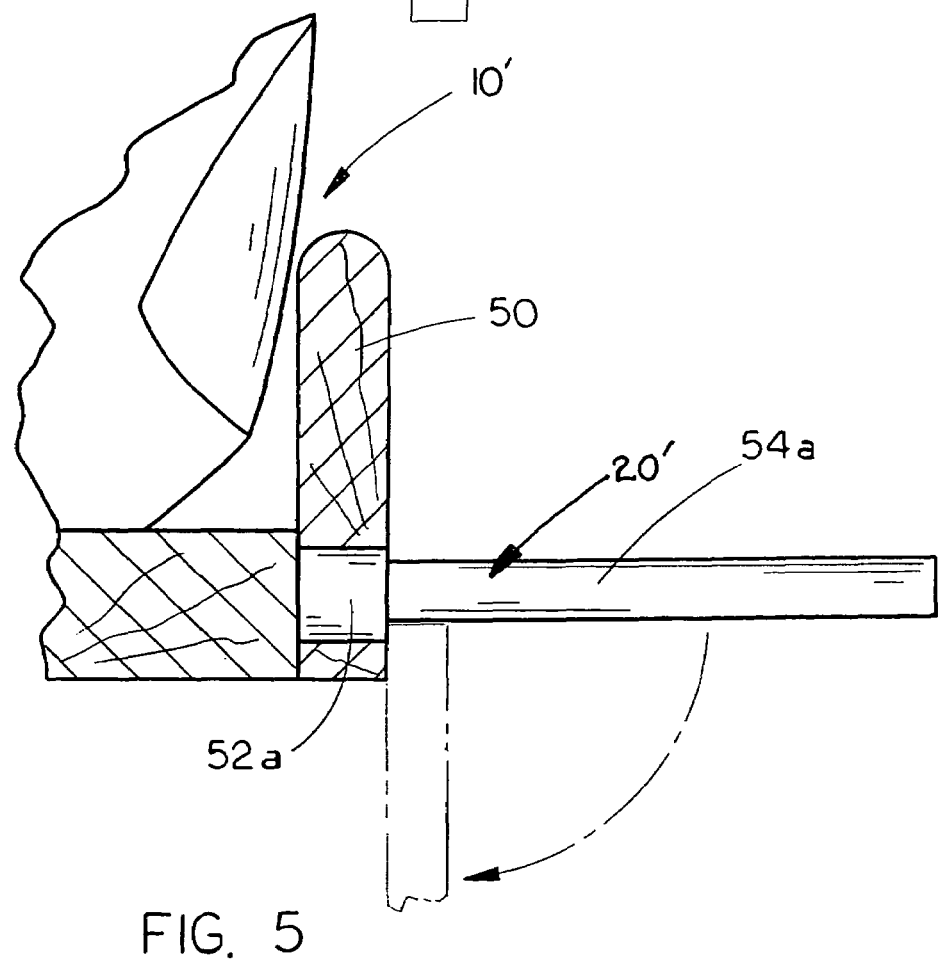
FIGS. 5, 6 and 7 are a detailed side elevational view, a perspective view and a detailed perspective view, respectively, of an alternative embodiment of the bird feeder with magnetic perch of the present invention having a different design which is mounted to the bird feeder.
Figure 6:
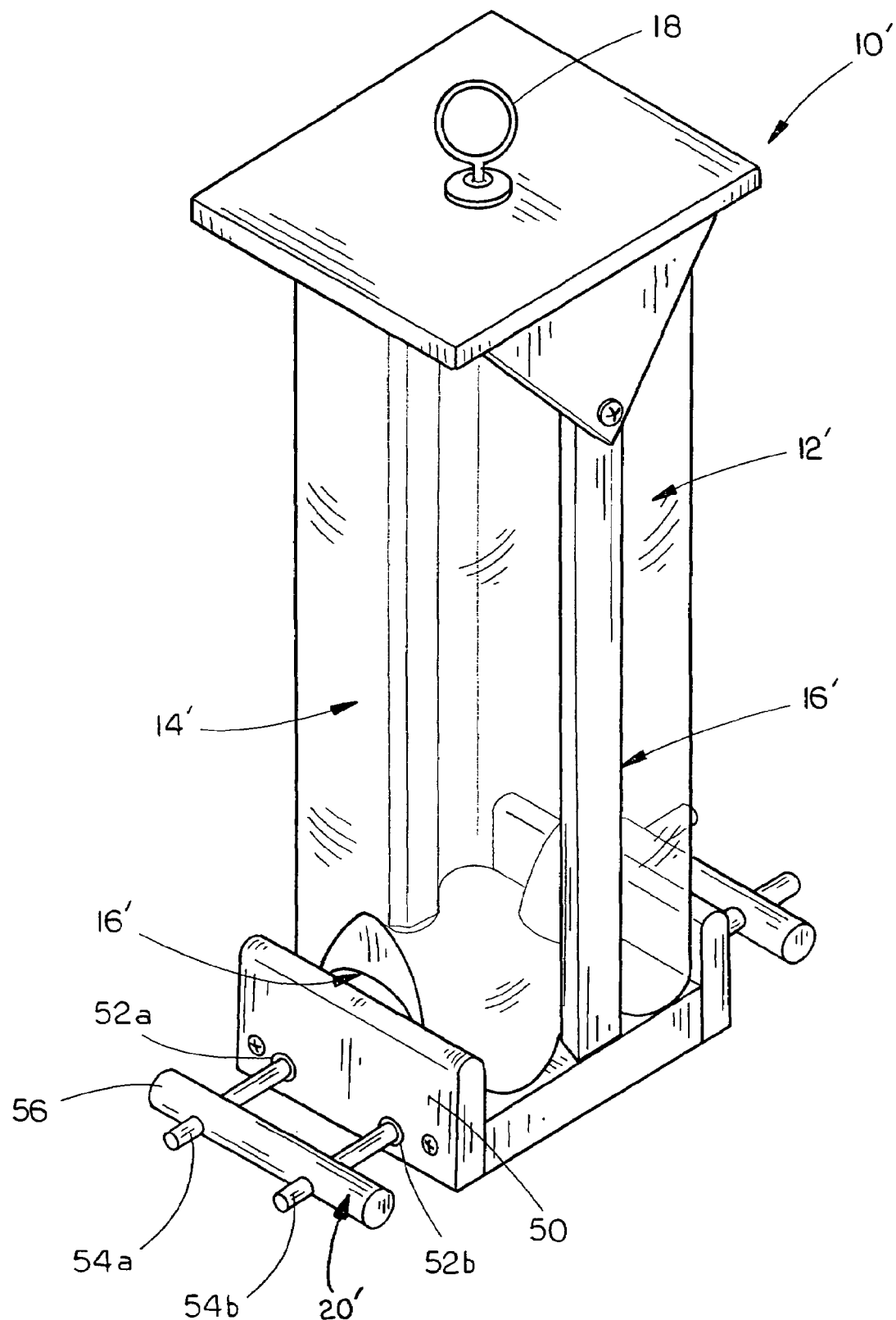
Figure 7:
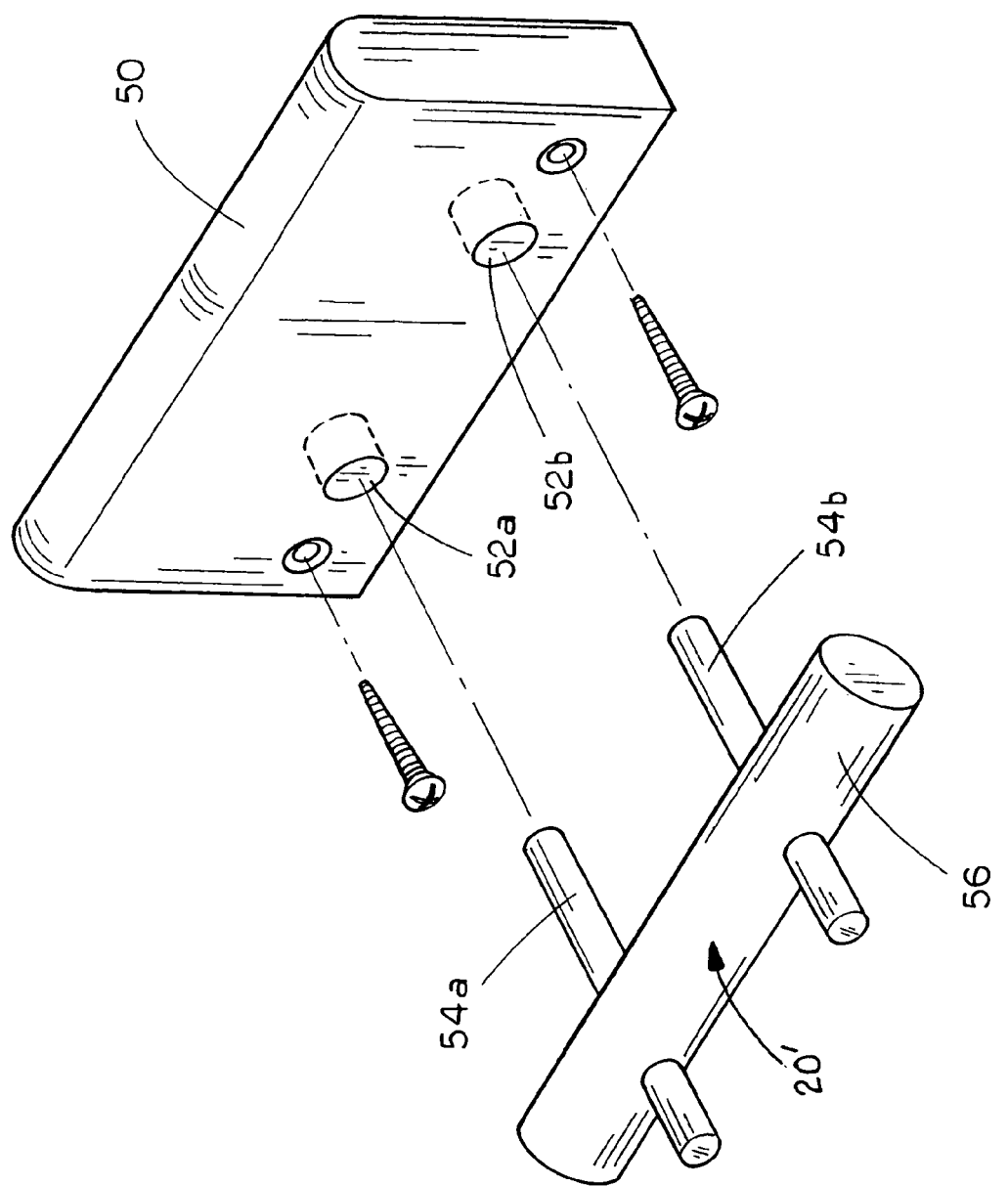

FIGS. 5, 6 and 7 illustrate an alternative embodiment of the bird feeder with magnetic perch 10' of the present invention which is more of a hopper-type bird feeder. In the embodiment of FIGS. 5-7, the bird feeder 12' would preferably include a feed hopper body 14' having feed access openings 16' positioned adjacent the base of the feed hopper body 14', with the entire bird feeder 12' being capable of being suspended in a feeding location by a top-mounted hook 18, as shown best in FIG. 6.

The significant modification to the magnetic perch assembly 20' of the embodiment of FIGS. 5-7 is that the magnetic perch assembly 20' would include a pair of outwardly-extending perch bar magnets 54a and 54b which would be magnetically mounted on a pair of perch strength control magnets 52a and 52b which are mounted within a wooden plate 50 mounted on feed hopper body 14' of bird feeder 12'. Mounted on and extending between the perch bar magnets 54a and 54b is a wooden dowel perch 56 which serves as a perch for birds landing on the dowel perch 56 such that the birds can face directly towards the feed access opening 16' of the bird feeder 12'. The magnetic perch assembly 20' of FIGS. 6 and 7 would function in generally the same manner as described in connection with the embodiments of FIGS. 1-4, however, in that the perch bar magnets 54a and 54b are magnetically connected to the perch strength control magnets 52a and 52b and when a bird which is too heavy lands on the dowel perch 56, the weight of the bird forces the perch bar magnets 54a and 54b downwards thus partially separating them from the perch strength control magnets 52a and 52b so that the perch bar magnets 54a and 54b tilt downwards relative to the perch strength control magnets 52a and 52b. This then startles the bird which has landed on dowel perch 56, thus causing the bird to release and fly away, and once the bird's weight is removed from the dowel perch 56, the magnetic attractive force between the perch strength control magnets 52a and 52b and perch bar magnets 54a and 54b reasserts itself to draw the perch bar magnets 54a and 54b back to their initial outwardly-extending position.

An important additional feature of the magnetic perch assembly 20' of FIGS. 5, 6 and 7 is that by adjusting the horizontal location of dowel perch 56 on perch bar magnets 54a and 54b, the downwards force necessary to partially separate the perch bar magnets 54a and 54b from perch strength control magnets 52a and 52b can be modified, specifically by moving the dowel perch 56 towards or away from the perch strength control magnets 52a and 52b. For example, if the dowel perch 56 is positioned adjacent the outer ends of the perch bar magnets 54a and 54b, the weight of the bird necessary to partially separate perch bar magnets 54a and 54b from the perch strength control magnets 52a and 52b is less than if the dowel perch 56 were positioned closer to the inner ends of the perch bar magnets 54a and 54b, simply due to the length of the fulcrum defined by the distance between the dowel perch 56 and perch strength control magnets 52a and 52b. This may render adjustment of the amount of force necessary to disengage the perch bar magnets 54a and 54b from perch strength control magnets 52a and 52b of magnetic perch assembly 20' far easier than that required in connection with magnetic perch assembly 20 of FIGS. 1-4. However, in either case, it is important to note that no mechanical contrivances are necessary to properly control access by various birds to the feed housed within the bird feeder, as such access is permitted or prevented due to the weight of the bird landing on the perch bar magnets 26a and 26b or 54a and 54b.

Also, it should be noted that although the embodiment of FIGS. 5-7 is shown as including the wooden plate 50, the perch strength control magnets 52a and 52b may be mounted directly on the feed hopper body 14' of bird feeder 12', and in fact, alternative configurations used with the embodiment of FIGS. 5-7 may prove superior as they will afford fewer locations on the feed hopper body 14' of bird feeder 12' for birds and squirrels to support themselves without resting on the perch bar magnets 54a and 54b. This will help to prevent birds and squirrels from "outsmarting" the magnetic perch assembly 20' by avoiding putting their weight on it such that the magnetic perch assembly 20' does not release thereby allowing them to access the feed stored within feed hopper body 14' of bird feeder 12'.

Figure 8:
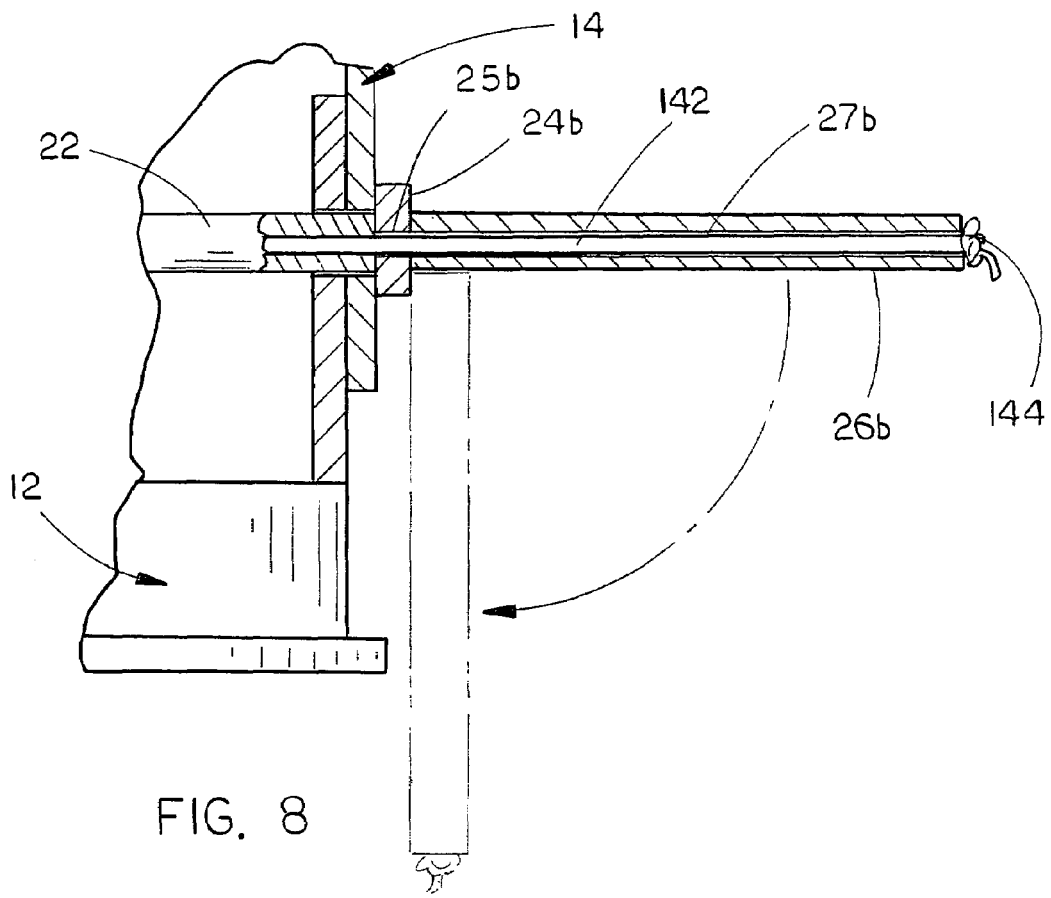
FIGS. 8 and 9 are detailed side elevational views of the perch magnet mounted on the stationary magnet and further including a resilient connection device extending between and connecting the perch assembly mounting structure and the perch bar.
Figure 9:
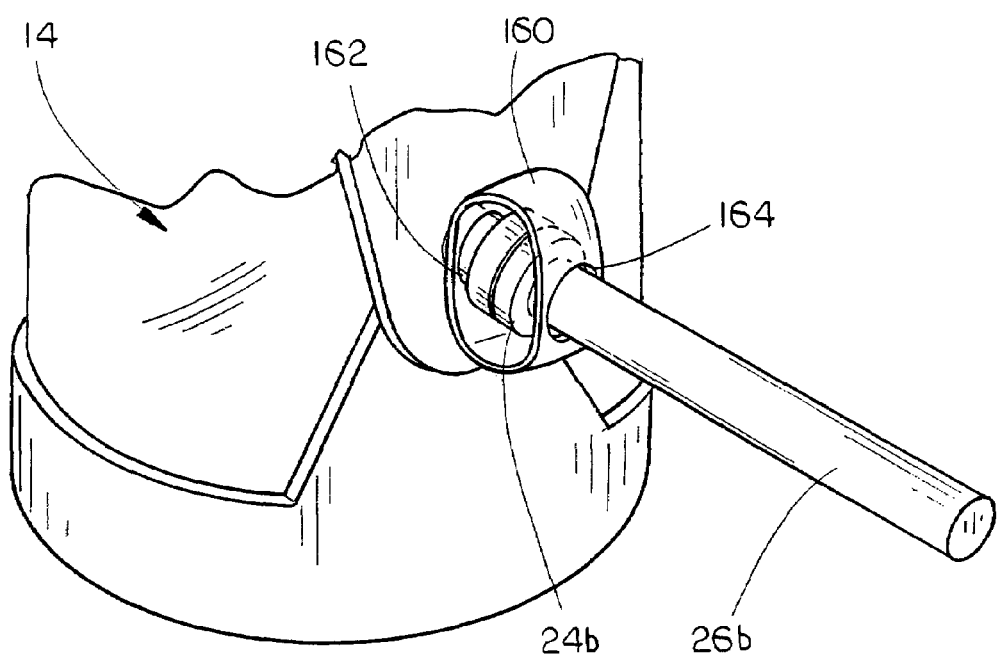

FIGS. 8 and 9 disclose additional functional elements of the present invention which enhance the functionality of the present invention. Specifically, FIGS. 8 and 9 show two variations of the present invention which include mechanisms for preventing the perch bar magnet 26b from completely dislodging from the perch strength control magnet 24b. It has been found that occasionally a squirrel or other such creature will grasp the perch bar magnet 26b and as the perch bar magnet 26b tilts downwards to partially disengage from the perch strength control magnet 24b, the squirrel or other such animal will tighten their grip on the perch bar magnet 26b instead of releasing their grip and fall with the perch bar magnet as it dislodges from the perch strength control magnet 24b. This results in the perch bar magnet 26b falling to the ground below the bird feeder 12 which can, in some circumstances, result in the perch bar magnet 26b being lost or misplaced for a period of time, thus rendering the bird feeder 12 inoperative on the side where the perch bar magnet 26b was dislodged. There is therefore a benefit to providing a resilient connection device which can be used to resiliently connect the perch bar magnet 26b to the perch strength control magnet 24b so that when the perch bar magnet 26b is partially disengaged from the perch strength control magnet 24b, the perch bar magnet 26b is resiliently retained in contact with the perch strength control magnet 24b to prevent the perch bar magnet 26b from being completely disengaged from the perch strength control magnet 24b.

In the example shown in FIG. 8, the resilient connection device is a flexible elastic cord 142 which extends through the center of center stationary magnet 22, through a center hole 25b formed in perch strength control magnet 24b and through a center longitudinal passage 27b formed in perch bar magnet 26b. The end of the elastic cord 142 is then tied in a knot 144 or the like to retain the elastic cord 142 within the center stationary magnet 22, perch strength control magnet 24b, and perch bar magnet 26b. The elastic cord 142 would operate in the following manner. When the perch bar magnet 26b is pivoted downwards relative to the perch strength control magnet 24b, as shown by the dotted lines of FIG. 8, the strength of the connection between the perch strength control magnet 24b and perch bar magnet 26b remains generally the same as originally designed so that the perch bar magnet 26b may disengage at least partially from the perch strength control magnet 24b upon the designed load being exerted on the perch bar magnet 26b. However, as the perch bar magnet 26b tilts downwards, the elastic cord 142 prevents the perch bar magnet 26b from completely disengaging from the perch strength control magnet 24b even if the animal attempts to hold on to the perch bar magnet 26b as was described previously. However, as soon as the animal releases the perch bar magnet 26b, the elastic cord 142 begins to pull the perch bar magnet 26b upwards to return it to its initial position providing support for birds perching thereon, and the perch strength control magnet 24b and perch bar magnet 26b then once again interact to secure the perch bar magnet 26b on the perch strength control magnet 24b as shown in FIG. 8.

An alternative embodiment of the resilient connector of the present invention is shown in FIG. 9 as including an elastic ring 160 which includes first and second holes 162 and 164 through which extend the center stationary magnet 22 and perch bar magnet 26b to resiliently retain the perch bar magnet 26b in connection with the perch strength control magnet 24b. The elastic ring 160 would function in generally the same manner as described in connection with elastic cord 142 of FIG. 8, namely that the perch bar magnet 26b is prevented from completely disengaging from the perch strength control magnet 24b, and thus once the offending animal has released the perch bar magnet 26b, the perch bar magnet 26b returns to its initial state as shown in FIG. 9. Of course, many other types of resilient connection devices may be used in connection with the present invention so long as the intended function of preventing complete disengagement of the perch bar magnets 26a and 26b from the perch strength control magnets 24a and 24b is generally maintained.

It is to be understood that numerous additions, modifications and substitutions may be made to the bird feeder with magnetic perch 10 of the present invention which fall within the intended broad scope of the above description. For example, although the present invention has been described as being used with a tube-type feeder and a hopper-type feeder, it should be readily apparent that the magnetic perch assembly 20 may be modified for use with virtually any type of bird feeder currently being produced, other than an open platform style of bird feeder, and such modifications and inclusions of the magnetic perch assembly 20 should be understood to be within the scope of this disclosure. Also, it should be noted that the magnetic perch assembly 20 of the present invention is actually designed to be retrofit as a kit onto already existing bird feeders 12, such that the perch structures of those bird feeders 12 can be replaced with the magnetic perch assembly 20 of the present invention. Furthermore, although the present invention has been described as being used in connection with neodymium rare earth magnets, other types of magnets may be used with the present invention so long as the functional characteristics of the bird feeder with magnetic perch 10 of the present invention are maintained. Finally, although the present invention has been described with some particularity, it should be noted that the length, height, width, N-rating or chemical composition, diameter of and distance between the magnets can be adjusted to obtain operationally desirable magnetic force characteristics and furthermore the magnets can be combined with plastic, wood or metal to serve as the carrier material to shape and position the magnets to achieve desired magnetic and operational performance characteristics.

There has therefore been shown and described a bird feeder with magnetic perch 10 which accomplishes at least all of its intended objectives.

I claim:

1. A bird feeder with a magnetically supported perch comprising:
    a bird feeder comprising a feed hopper body having a feed access opening therein to permit feeding birds to access bird feed stored within said bird feeder and a perch assembly base;
    a magnetic perch assembly comprising a longitudinally elongated perch bar having a magnetic inner end, wherein said magnetic inner end of said perch bar is magnetically attracted to said perch assembly base such that said magnetic perch assembly is releasably mounted on and extends outwards from said perch assembly base; and
    a resilient connection device extending between said perch assembly base and said magnetic perch assembly, wherein said connection device prevents complete disengagement of said magnetic perch assembly from said perch assembly base thereby preventing separation and loss of said magnetic perch assembly from said bird feeder.

2. The bird feeder with a magnetically supported perch of claim 1 wherein said perch assembly base further comprises a perch strength control magnet.

3. The bird feeder with a magnetically supported perch of claim 1 wherein said perch assembly base further comprises a magnetically active ferrous metal element.

4. The bird feeder with a magnetically supported perch of claim 1 wherein said magnetic perch assembly is a generally cylindrical magnetic bar.

5. The bird feeder with a magnetically supported perch of claim 1 wherein said magnetic perch assembly comprises a neodymium magnet having a neodymium core composed of neodymium, iron and boron and further including a nickel casing enclosing said neodymium core to protect said neodymium core.

6. The bird feeder with a magnetically supported perch of claim 1 wherein said magnetic perch assembly at least partially disengages from said perch assembly base upon force being applied to said magnetic perch assembly which exceeds the magnetic force releasably securing said magnetic perch assembly on said perch assembly base.

7. The bird feeder with a magnetically supported perch of claim 1 wherein said resilient connection device comprises an elastic cord extending between said perch assembly base and said magnetic perch assembly.

8. A bird feeder with a magnetically supported perch comprising:
    a bird feeder comprising a feed hopper body having a feed access opening therein to permit feeding birds to access bird feed stored within said bird feeder and a perch assembly base generally adjacent said feed access opening;
    a magnetic perch assembly comprising a longitudinally elongated perch bar having a magnetic inner end, wherein said magnetic inner end of said perch bar is magnetically attracted to said perch assembly base such that said magnetic perch assembly is releasably mounted on and extends outwards from said perch assembly base;
    wherein said magnetic perch assembly at least partially disengages from said perch assembly base upon force being applied to said magnetic perch assembly which exceeds the magnetic force releasably securing said magnetic perch assembly on said perch assembly base; and
    a resilient connection device extending between said perch assembly base and said magnetic perch assembly, wherein said connection device prevents complete disengagement of said magnetic perch assembly from said perch assembly base thereby preventing separation and loss of said magnetic perch assembly from said bird feeder.

9. The bird feeder with a magnetically supported perch of claim 8 wherein said perch assembly base further comprises a perch strength control magnet.

10. The bird feeder with a magnetically supported perch of claim 8 wherein said perch assembly base further comprises a magnetically active ferrous metal element.

11. The bird feeder with a magnetically supported perch of claim 8 wherein said magnetic perch assembly is a generally cylindrical magnetic bar.

12. The bird feeder with a magnetically supported perch of claim 8 wherein said magnetic perch assembly comprises a neodymium magnet having a neodymium core composed of neodymium, iron and boron and further including a nickel casing enclosing said neodymium core to protect said neodymium core.

13. The bird feeder with a magnetically supported perch of claim 8 wherein said resilient connection device comprises an elastic cord extending between said perch assembly base and said magnetic perch assembly.

14. A magnetically supported perch for a bird feeder comprising:
    a perch assembly base adapted to be mounted on a bird feeder generally adjacent a feed access opening of the bird feeder;
    a magnetic perch assembly comprising a longitudinally elongated perch bar having a magnetic inner end, wherein said magnetic inner end of said perch bar is magnetically attracted to said perch assembly base such that said magnetic perch assembly is releasably mounted on and extends outwards from said perch assembly base;
    wherein said magnetic perch assembly at least partially disengages from said perch assembly base upon force being applied to said magnetic perch assembly which exceeds the magnetic force releasably securing said magnetic perch assembly on said perch assembly base; and
    a resilient connection device extending between said perch assembly base and said magnetic perch assembly, wherein said connection device prevents complete disengagement of said magnetic perch assembly from said perch assembly base thereby preventing separation and loss of said magnetic perch assembly from said bird feeder.

15. A bird feeder with a magnetically supported perch comprising:

a bird feeder;

a perch assembly base for said bird feeder;

a perch strength control magnet adapted to be mounted on said perch assembly base;

a magnetic perch assembly having a magnetic inner end; and wherein said magnetic inner end is magnetically attracted to said perch strength control magnet such that said magnetic perch assembly is releasably mounted on said perch assembly base; a resilient connection device extending between said perch assembly base and said magnetic perch assembly, wherein said connection device permits said magnetic perch assembly to at least partially disengage from said perch assembly base and prevents complete separation of said magnetic perch assembly from said perch assembly base.

* * * * *